United States Patent

Barger et al.

[11] Patent Number: 5,809,843
[45] Date of Patent: Sep. 22, 1998

[54] ACTIVE CANCELLATION OF NOISE AT GEAR MESH FREQUENCIES FOR A GEAR ASSEMBLY UNDER LOAD

[75] Inventors: James E. Barger; Bruce S. Murray, both of Winchester; Daniel L. Nelson, Arlington, all of Mass.

[73] Assignee: BBN Corporation, Cambridge, Mass.

[21] Appl. No.: 779,588

[22] Filed: Jan. 7, 1997

[51] Int. Cl.⁶ .................................................. F16F 15/00
[52] U.S. Cl. ............................................................ 74/574
[58] Field of Search .................... 74/574, 572; 364/574, 364/572; 701/111, 110

[56] References Cited

U.S. PATENT DOCUMENTS 4,977,508  12/1990  Tanaka et al. .
5,291,975   3/1994  Johnson et al. ....................... 74/574 X
5,553,514   9/1996  Walkowc ................................. 74/574

FOREIGN PATENT DOCUMENTS

3168442  7/1991  Japan ....................................... 74/574

*Primary Examiner*—Charles A. Marmor
*Assistant Examiner*—Mary Ann Battista
*Attorney, Agent, or Firm*—Leonard C. Suchyta

[57] ABSTRACT

A method and apparatus to cancel gear vibration and noise by imposing a canceling drive torque or force on a driven gear set. Sensors receive information and produce an error signal representative of the vibration and/or noise generated at meshing gears. The error signal indicative of vibration and/or noise information is provided to a control mechanism that processes the noise information to generate a corresponding drive torque. The drive torque corresponding to the noise information is applied to a drive shaft or through a power supply to reduce vibration and noise of the gear assembly at gear meshing frequencies.

17 Claims, 8 Drawing Sheets

ACTIVE CANCELLATION OF NOISE AT GEAR MESH FREQUENCIES FOR A GEAR ASSEMBLY UNDER LOAD

FIELD OF THE INVENTION

The present invention relates to active noise cancellation, and in particular to the active cancellation of vibration and noise emitted from motor driven mechanical systems, especially tonal vibration resulting from gears meshing.

BACKGROUND OF THE INVENTION

Through a variety of mechanisms, engaged or meshed mechanical gears, or gears and pinions, generate vibration and noise while running. While gears meshing under load will generate some noise, the level of noise is exacerbated when the gears are subjected to unsteady and/or unbalanced forces. Tooth-to-tooth spacing errors, gear tooth elasticity, and intentional and unintentional deviations of tooth running surfaces from ideal configurations, generate unsteady forces and motion that results in vibration and noise. Such noise and vibration sources may be found in a wide variety of gear types, including spur, helical and bevel type gears.

The vibration (and noise) spectra generated by meshed and running gears is primarily tonal in nature. There are strong tones corresponding to the gear mesh frequency and harmonics thereof. In addition, there are tones corresponding to the rotation rate of each gear, and harmonics thereof. Gear mesh tonal noise is different from and in addition to tonal noise that appears at frequencies related to the passage of armature slots within the motors, or related to harmonics of line frequency if an SCR drive is used. Furthermore, gear mesh noise is present regardless of the type of prime mover or drive mechanism.

Controllers have been devised, as described in published international application number WO 93/19458 ("PCT '458"), which when coupled to the circuit described therein, can actively control in a limited manner, limited noise present in an electromechanical system. Specifically, in PCT '458, electronic circuitry is disclosed which can be used to cancel slot noise in an electric motor. Adaptive active cancellation controllers have been developed and are commercially available, such as the NCT 2000 and 2010 discussed in PCT '458, which are used to cancel periodic noise which arises, typically, from rotating machinery. These controllers attempt to cancel noise by adapting the coefficients of cosine and sine components of the frequencies to be canceled to produce a 180 degree out of phase signal to cancel the periodic tonal noise.

The PCT '458 reference describes in some detail, the use of an adaptive algorithm to cancel slot noise and harmonics thereof in a D.C. motor. The noise that is addressed in PCT '458 results as torque impulses induced from the rotor to the stator of the drive motor as the armature rotates. A 180 degree out of phase signal is applied to cancel such noise, and according to PCT '458 is added in two places: the field coil; and the armature coil.

However, the slot noise cancellation process described in PCT '458 does not address noise introduced by meshing gears. Furthermore, the PCT '458 noise cancellation mechanism is significantly limited to cancellation of slot noise in an electromechanical system where the prime mover is a D.C. electric motor. The noise cancellation mechanism in the PCT '458 reference does not address noise in mechanical systems which incorporate other prime movers such as gas turbine systems, diesel generators or internal combustion engines or the like. Similarly, the active noise cancellation processes known in the art do not address or eliminate the gear meshing contribution to overall system vibration and noise where the meshing gears are isolated such as by flexible mountings or couplings.

SUMMARY OF THE INVENTION

The present invention provides a method and apparatus to cancel gear vibration and noise by modulating a cancellation drive torque on a driven gear set. According to the invention, sensors located proximate to meshing gears or integrated with a power supply to a prime mover, receive information representative of vibration and noise generated at the meshing gears. The noise information is provided to a control mechanism that processes the noise information to generate a corresponding drive torque. The drive torque corresponding to the noise information is applied to a drive shaft or power supply to reduce vibration and noise of the gear assembly at gear meshing frequencies.

Active control of the torque on the gear drive shaft, according to the invention, can be implemented in various systems with various prime movers including electric motors (AC and DC), gas turbine systems, diesel generators or internal combustion engines or the like. In any of various contexts according to the invention an appropriate corrective torque and/or linear force is imposed on a gear/shaft combination to effect a displacement at the gear tooth meshing interface so as to cancel the effects of imperfections including those attributable to gear tooth spacing, tooth shape, or the like. The corrective torque or force imposed is imposed with an appropriate frequency content, amplitude, and phase that results in desired noise and/or vibration reduction at points of interest.

Features of gear mesh noise cancellation according to the invention include significant reduction of audible vibration and noise in various mechanical and electromechanical systems in which the mechanism can be implemented. A consequent, significant reduction in wear and stress on the gear teeth of mating gears can be realized in such systems. Reduced fluctuations in the load on the gear tooth faces and roots, resulting from cancellation of gear mesh noise and vibration according to the invention, enables more power to be transmitted by existing gears. Practicing the invention may also permit the use of cheaper gears for an equivalent application.

Furthermore, when active noise cancellation according to the invention is used to reduce or eliminate the gear meshing contributions to overall system vibration, and if the prime mover or motor itself is sufficiently quiet, then the prime mover malt not have to be resiliently mounted for noise and vibration control purposes. If the prime mover resilient mounting is eliminated, then proper alignment of the drive shaft and other components can usually be achieved without the need for a flexible shaft coupling, which is often used between the prime mover and the gear assembly in known systems. The elimination of the flexible shaft coupling will provide a substantial cost savings in many applications.

BRIEF DESCRIPTION OF THE DRAWING

The invention will be more fully understood from the following detailed description of illustrative embodiments thereof, taken in conjunction with the accompanying drawing in which:

in FIG. 4;

DETAILED DESCRIPTION

Figure 1:
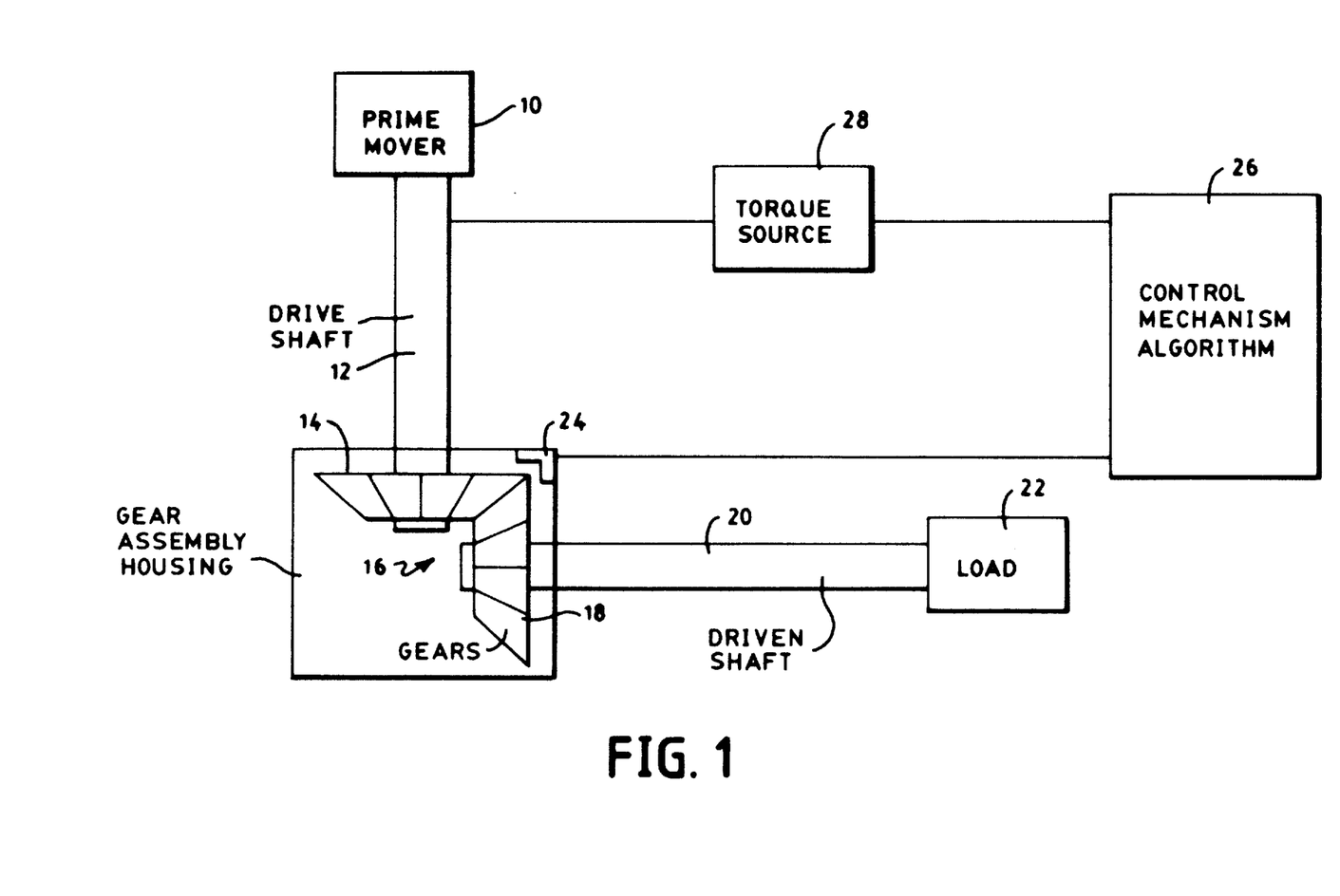
FIG. 1 is a diagrammatic representation of an implementation of gear mesh active noise cancellation according to the invention.

A basic representative configuration of gear mesh active noise cancellation is illustrated in FIG. 1, which generally illustrates a prime mover 10, such as a motor, turning a drive shaft 12 having a first gear 14 disposed thereon. The first gear 14 is part of a gear assembly 16 that also includes a second gear 18. The second gear 18 of the gear assembly 16 turns a driven shaft 20 that drives a load 22. At least one sensor 24 senses vibration and/or noise of the meshed first gear 14 and second gear 18. A control mechanism 26 receives an error or vibration signal from the sensor 24, indicative of the vibration and/or noise sensed at the meshed gears. The control mechanism 26 processes the error signal in accordance with a control algorithm and generates a signal that is translated by a torque source 28 into a modulating torque which is applied on the first drive shaft 16 attached to the prime mover 10 in this general, illustrative embodiment. The modulating torque is continually controlled based on information from the sensor(s) which respond to the mechanisms that create the vibration and noise at the meshed gears.

In situations where an electric motor is used as a prime mover, it has been observed that slight variations in torque on the drive shaft, due to meshing gear teeth, cause speed variations in the motor and corresponding variations in supply line current. In effect, the motor acts as a generator or transducer converting the mechanical interactions at the meshing gears into electrical phenomena observable in the electrical characteristics of the motor. These variations in supply line current observed in the electric motor prime mover can be a suitable input to a control mechanism effecting generation of a modulating torque to be applied to the gears, as discussed in detail hereinafter. Likewise, it will be appreciated that the same concepts apply in virtually any mechanical or electromechanical system where the prime mover can be observed as acting as a transducer of gear noise. Effectively, if the prime mover is observed acting as a transducer, it can be configured according to the invention to be used as a transducer to impart corrective or cancellation torques that are a function of the gear noise observed.

Figure 2:
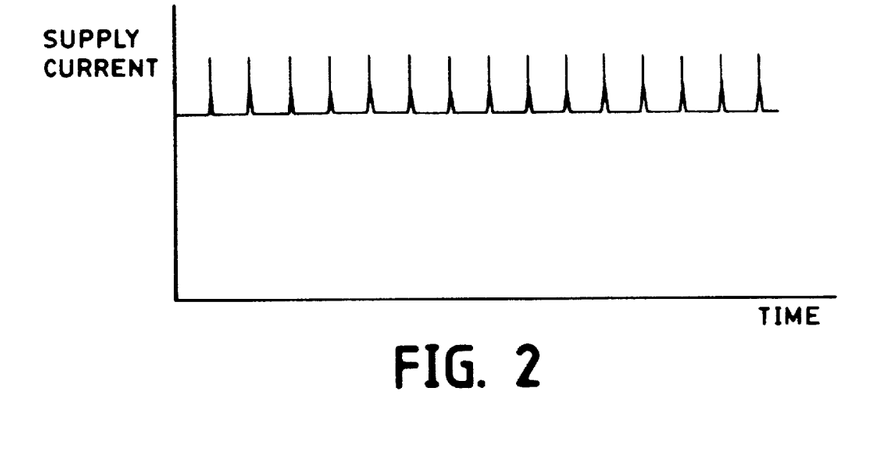
FIG. 2 is a graphic depiction of periodic spikes, caused by the unsteady forces resulting in noise/vibration in a gear assembly, reacting back in the motor and being impressed on input line current.
Figure 3:
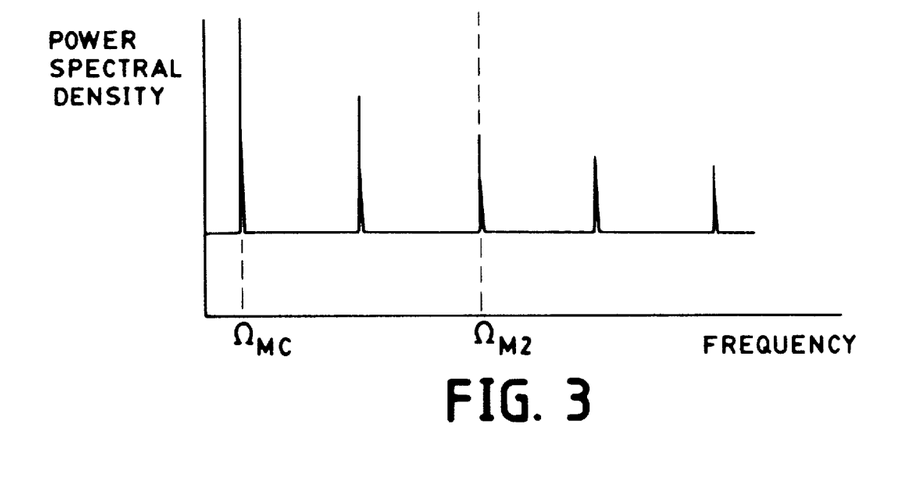
FIG. 3 is a plot of the Power Spectral Density of the periodic spikes of FIG. 2, which shows strong tones occurring at frequencies corresponding to the mesh frequency of gears in a gear assembly, and corresponding to the various harmonics of the mesh frequency.

As illustrated in FIG. 2, relating to an electric motor as a prime mover, periodic spikes caused by the unsteady forces resulting in noise/vibration in the gear assembly reacting back in the motor, are impressed on the supply current of the electric motor. Slight variations in torque from the meshing teeth result in the noise/vibration being sent back through the motor, which then acts as a generator producing the observed current spikes. A plot of the Power Spectral Density, as illustrated in FIG. 3, shows strong tones occurring at frequencies corresponding to the mesh frequency of the gears in the gear assembly, $\omega Mo$, and to the various harmonics of the mesh frequency, $\omega M2$. It may be possible to find tones corresponding to shaft rates and their harmonics as well.

Figure 5:
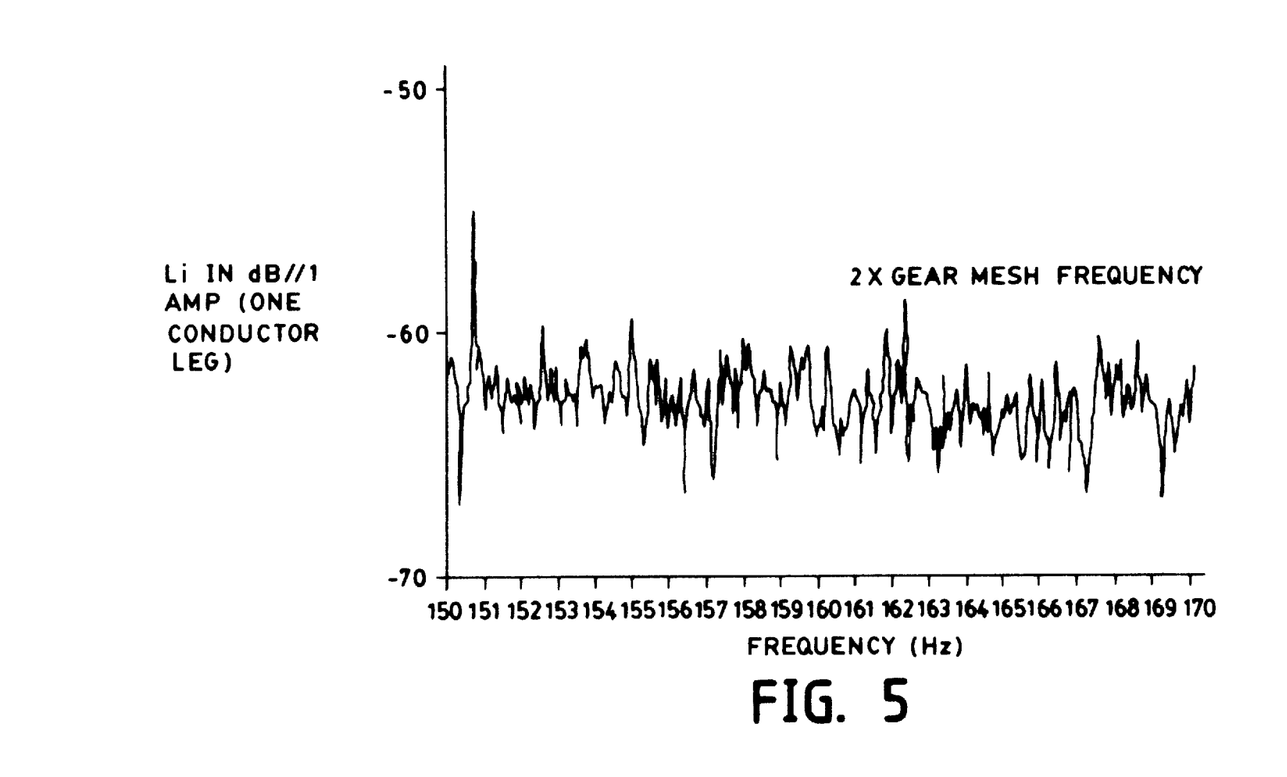
FIG. 5 shows a current spike seen at twice the gear mesh frequency in the inductively measured motor current illustrated.
Figure 6:
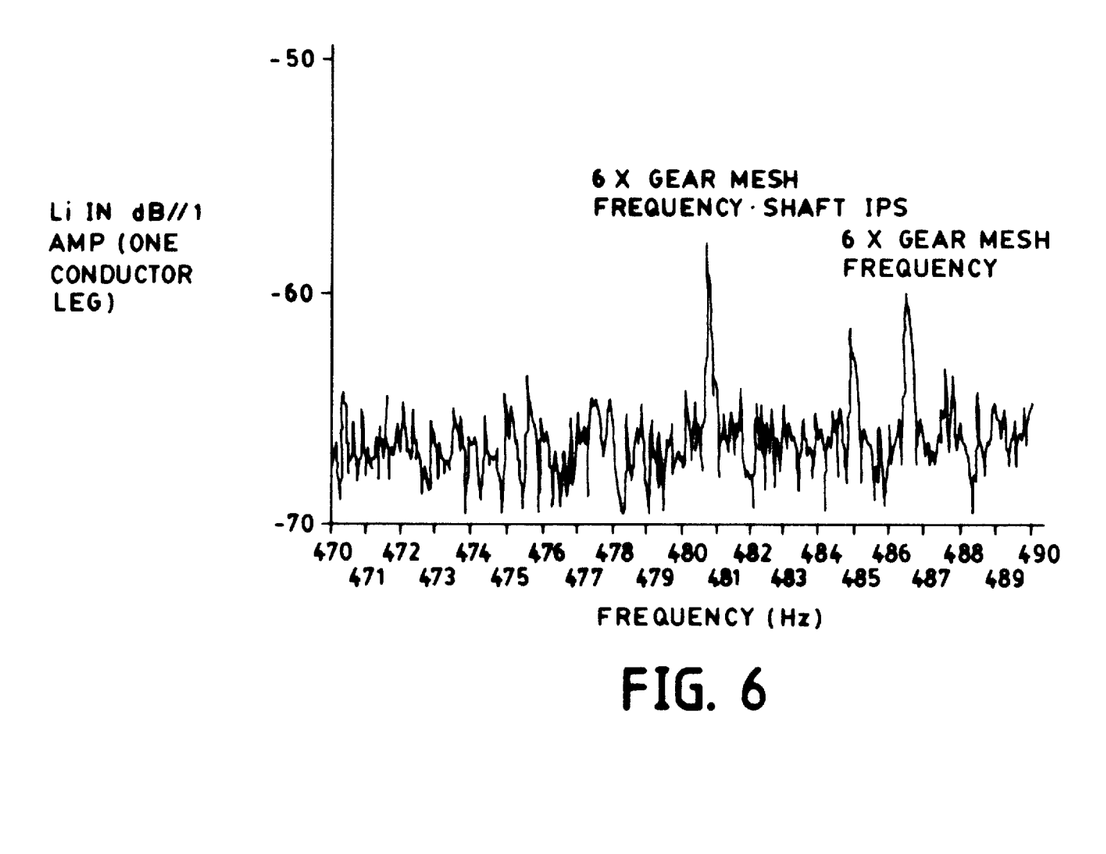
FIG. 6 shows a current spike seen at six times the gear mesh frequency, and one sideband tonal is also evident, in the inductively measured motor current illustrated in FIG. 4.

Signals caused at the frequencies of concern, as noise/vibration, are measurable as current spikes on the power supply line to the electric motor. Measurements on a proprietary marine system having a very large DC motor driving a gear assembly through a flexible coupling in a drive shaft are shown in FIGS. 4, 5 and 6.

Figure 4:
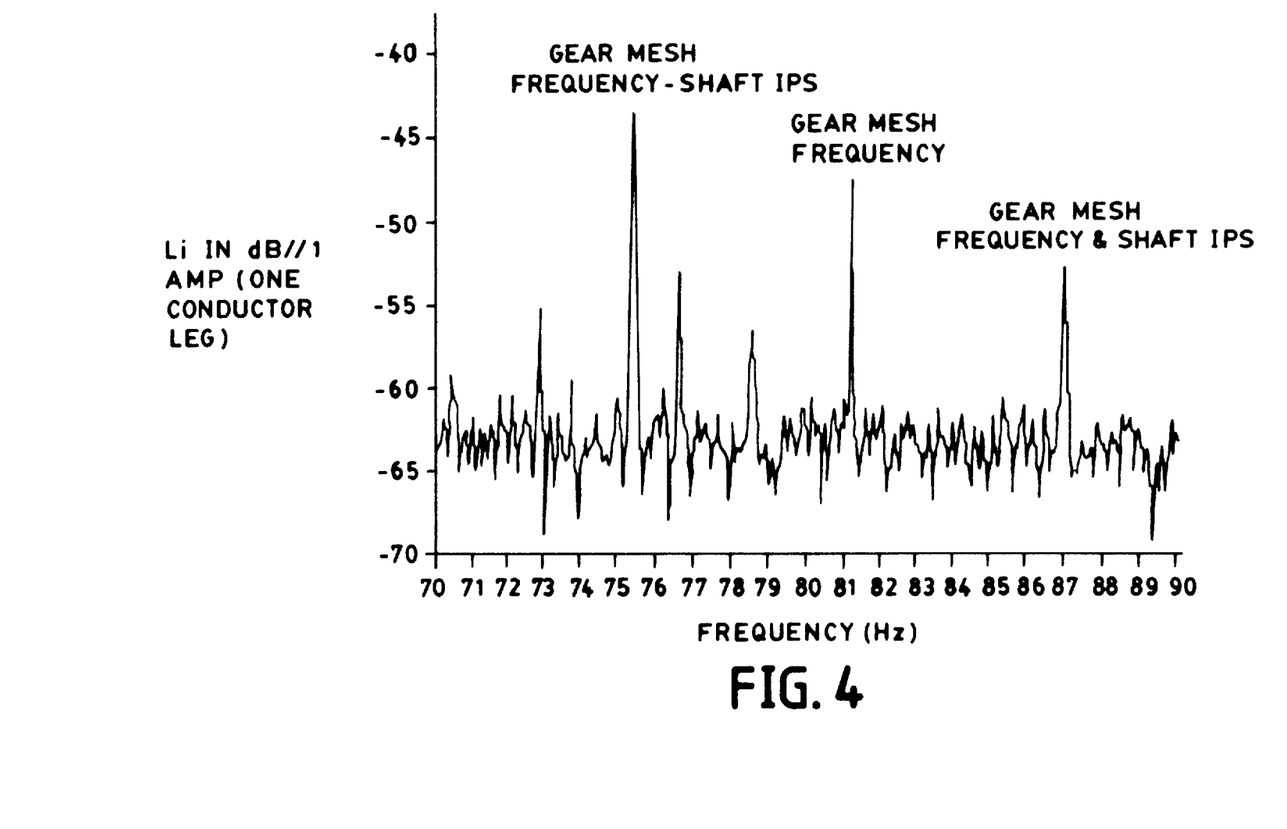
FIG. 4 shows a gear meshing fundamental frequency and two sideband tones resulting from shaft rate modulation as measured in motor current measured inductively on one of the conductors from a power supply in a marine system having a large D.C. motor driving a gear assembly.

FIG. 4 shows the motor current measured inductively on one of the conductors from the power supply. Current spikes ranging from 10 to 20 dB above the nominal current are seen at the gear mesh frequency (approximately 81 Hz) and at the gear mesh frequency plus and minus the shaft rotation rate (approximately 75 Hz and 87 Hz). Current spikes are also seen at multiples of the gear mesh frequency, as shown in FIG. 5 (twice the gear mesh frequency) and FIG. 6 (six times the gear mesh frequency). These signals are clearly of sufficient magnitude to be detected inductively and as exhibited, are stable over time. Clearly, the prime mover is acting as a transducer of the gear mesh noise, converting it from the mechanical domain to an observable electrical phenomena.

Figure 7A:
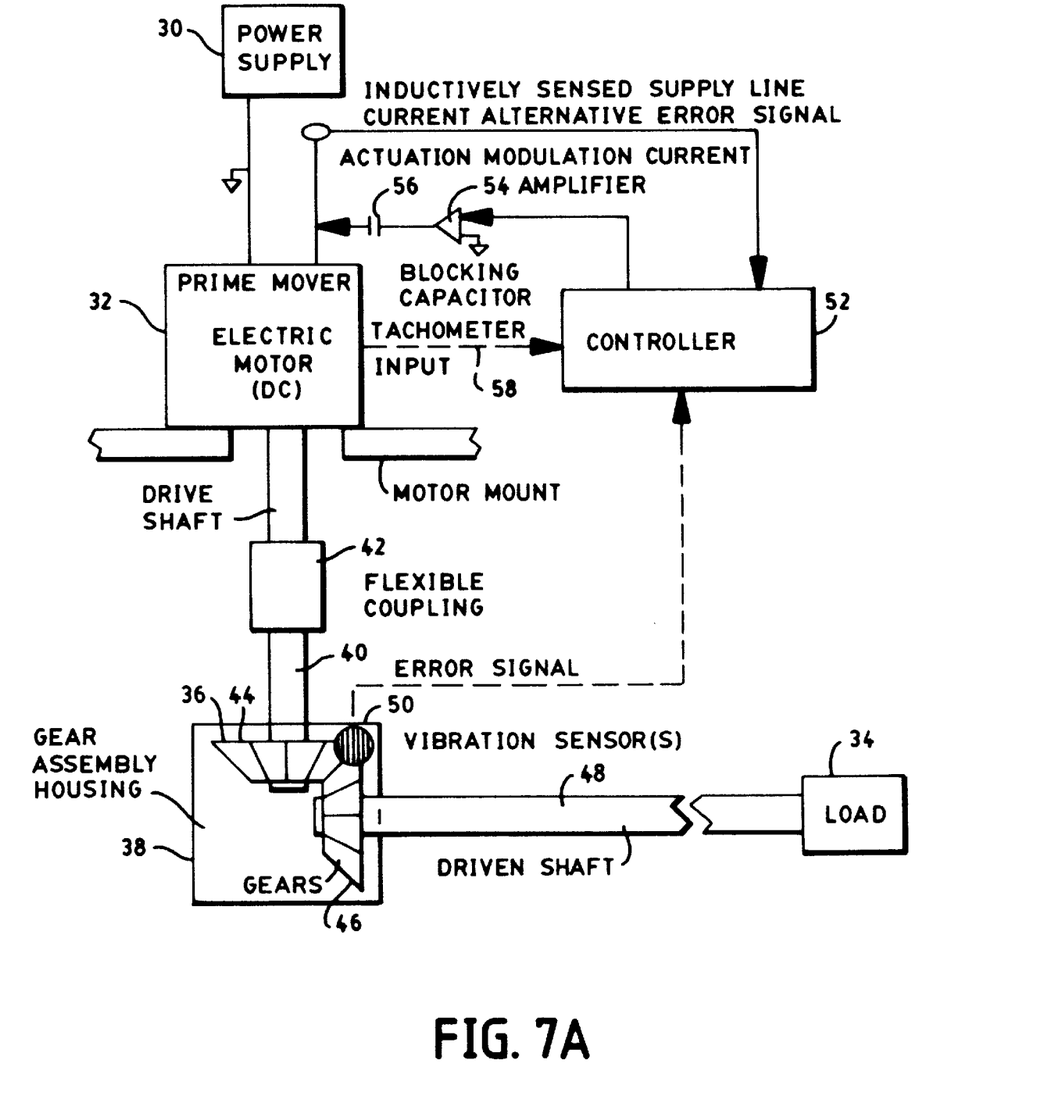
FIG. 7A illustrates an embodiment of active gear mesh noise cancellation implemented in an application in which a power supply powers a DC electric motor that drives a load through a gear assembly.

In an embodiment of the invention illustrated in FIG. 7A, active gear mesh noise cancellation is implemented in an application in which the prime mover is a DC motor. A power supply 30 powers the DC electric motor 32 that drives a load 34 through a gear assembly 36. A bevel gear assembly 36 enclosed in a housing 38 is shown, but the concept may be applied to any gear assembly driven by an electric motor, enclosed in a housing or otherwise. Likewise, as discussed, the concept may be applied to any prime mover that can be observed to act as a transducer of gear mesh noise and/or vibration. The motor 32 is connected to a drive shaft 40 that includes a flexible coupling 42, which transmits steady torque while compensating for slight misalignments and for high frequency torque variations. Such flexible couplings are often placed in the drive between the electric motor and the gear assembly, as shown.

The gear assembly 36 includes a first bevel gear 44 connected to the drive shaft 40. The first bevel gear 44 meshes with a second bevel gear 46. The second bevel gear 46 is attached to a second drive shaft 48, or driven shaft. The drive shafts and gear assembly translate the torque from the motor 32 to drive the load 34. Such a drive system is typical of one which may be used, for example, in marine applications.

As illustrated in FIG. 7A, a power supply 30 input to the motor can be inductively sensed to acquire a vibration or error signal impressed on the supply line current, as discussed hereinbefore. The inductively sensed supply line current vibration/error signal is representative of the amplitudes of the respective vibration frequencies induced in the meshing gears as a result, among other things, of the unsteady/unbalanced forces exerted thereon. The error signal is fed to a controller 52, where canceling signals appropriately adjusted in amplitude and phase are generated, such as 180 degree out of phase signals.

In generating canceling signals, the controller 52 receives the error signal and applies a control algorithm, such as known in the art. The invention described herein does not require a particular control algorithm, and it should be appreciated that various control algorithms may be used that effect generation of an appropriate torque modulation, based on the vibration or error signal derived from the inductively or otherwise sensed error signal. The control algorithm may generate an appropriate torque modulation canceling signal based on empirically derived knowledge of the drive shaft and gear mesh frequencies, such as could be obtained by observing the power spectral density of the signals generated at the gear mesh frequencies with a frequency analyzer. A control algorithm may be used as well that relies upon a periodic signal at the shaft and gear mesh periodicity such as a signal input derived from a tachometer (58 in FIG. 7A), encoder, or other synchronization measurement input to the controller/control algorithm.

Control mechanisms (26 FIG. 1), including control algorithms, that can be implemented in the apparatus as described herein include mechanisms having feedback control obtained with tuned, high gain, narrowband filters in a feedback loop with a tuning frequency derived from measurement of the shaft rotation rate (e.g., with a tachometer). Feedforward control can be implemented with a reference signal from a tachometer and having Least-Mean-Squared-like adaptation of cancellation filters. Similarly, control may be obtained through broadband feedback with high gain filters in a feedback loop over the entire frequency range of reduction.

In the present illustrative embodiment of FIG. 7A, the canceling signals generated by the controller 52, are sent to an amplifier 54, and added to the supply current in such a manner as to cancel the signals caused by the meshing of the gears. The canceling signal is produced as an actuation modulation current at each frequency (and at harmonics of that frequency, if desired) that is equal in magnitude and opposite in phase to the vibration or error signal. A blocking capacitor 56 prevents the DC supply current from reaching the amplifier 54 and controller 52.

Figure 7B:
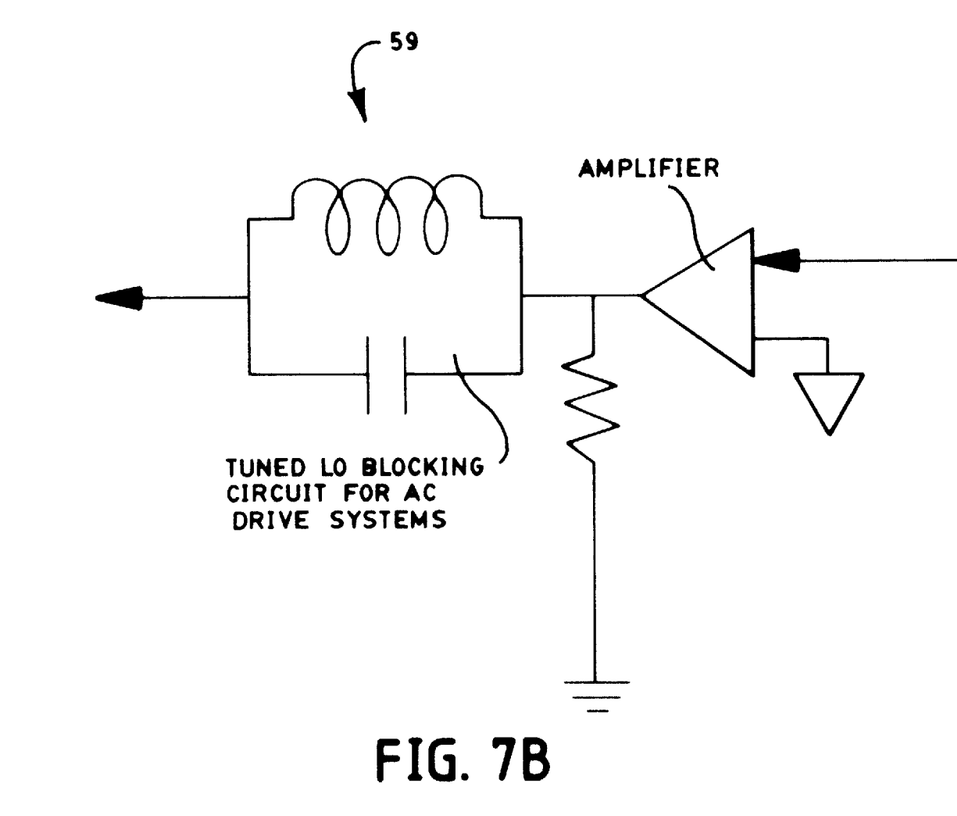
FIG. 7B depicts a tuned LC circuit used to keep AC supply current from reaching an amplifier and controller in an embodiment of active gear mesh noise cancellation implemented in an application in which a power supply powers an AC electric motor that drives a load through a gear assembly.

A similar arrangement may be used for an AC motor. Where an AC motor is the prime mover, a suitable tuned LC circuit is used to keep the AC supply current from reaching the amplifier and controller. An illustrative, tuned LC blocking circuit is shown in FIG. 7B. The tuned LC blocking circuit 59, replaces the blocking capacitor 56 of FIG. 7A.

While use of the vibration or error signal inductively sensed from the power line of the prime mover/motor offers a simple approach, for some applications flexible coupling and/or the dynamic response characteristics of the prime mover itself may preclude use of an error signal inductively sensed from the input power line. In some applications, the supply current will not provide a sufficient signal for detection of vibration generated at certain frequencies, for use as an inductively sensed error signal. In such applications one or more vibration sensors 50 may be mounted on or in the housing 38 of the gear assembly 36 to determine the important frequencies of gear mesh noise and the magnitude of the disturbance at these frequencies.

Illustrated as well in FIG. 7A, one or more transducers or vibration sensors 50, e.g., accelerometers or microphones (shown with a dotted line between the gear assembly 36 and controller 52), is suitably mounted on or in the gear box assembly housing 38. It is advisable to ensure that an accelerometer or other transducer is mounted so that its sensitive direction is approximately in line with the tangential gear mesh force vector. The vibration sensor picks up the noise/vibration resulting from the unsteady forces on the meshing gears and via transduction, as known in the art, generates an error signal that is representative of the amplitudes of the respective frequencies of vibration, in a frequency range (dynamic response) to which the vibration sensor is responsive. The error signal produced by the transducer is fed to the controller 52, where canceling signals, such as 180 degree out of phase signals, are generated. The controller 52 is then used to impress an actuation modulation current signal, corresponding to the gear mesh noise frequencies, onto the supply current, as shown in FIGS. 7A and 7B for DC and AC motor prime movers, respectively.

Gear sets in some applications may be driven by prime movers other than electric motors, e.g. gas turbine systems, diesel generators or internal combustion engines or the like, or there may be a flexible coupling between the prime mover and the gears which is too compliant to transmit measurable oscillating torques at the gear mesh frequency and its harmonics, or other frequencies of interest. In such applications an alternate method and apparatus for active noise cancellation according to the invention can be implemented.

Figure 8:
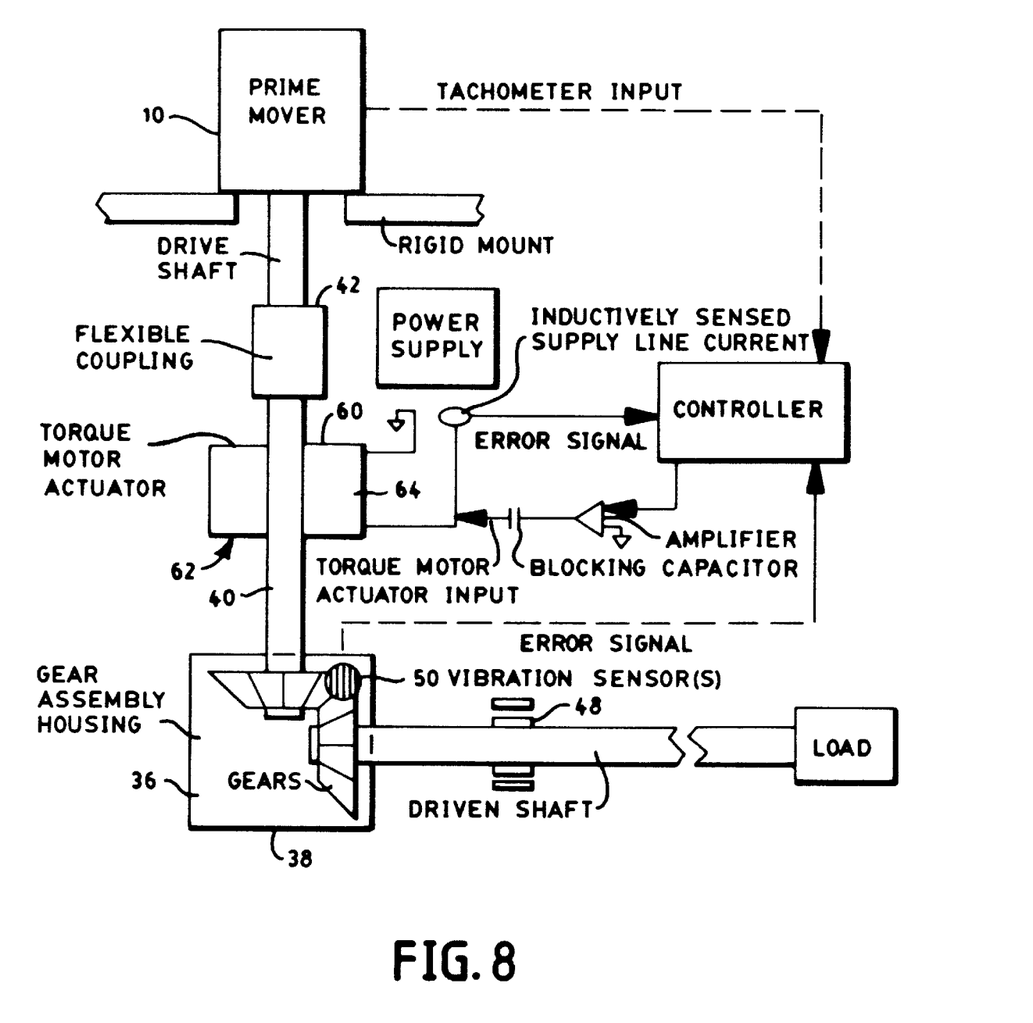
FIG. 8 illustrates an embodiment of active gear mesh noise cancellation wherein a modulated gear mesh noise cancellation signal is applied to a drive shaft via an auxiliary torque motor.

Referring now to FIG. 8, a rotor 60 of a suitably sized torque motor 62 (induction motor, angular servo, etc.) adapted to pick up the AC signals at the frequencies of interest, is attached to the drive shaft 40 proximate to the gear assembly 36, and between the gear assembly 36 and the flexible coupling 42 if the drive shaft is so configured. The rotor 60 of the torque motor 62 is rigidly attached to the drive shaft 40 driving the gear assembly 36. The stator 64 of the torque motor 62 is separately mounted so that there is no contact between the two. The torque motor 62 may then be used to both pick up the AC disturbance signal at the frequencies of interest and to introduce the torque motor actuator input canceling signal back into the rotor 60 of the torque motor 62. As illustrated, the vibration signal can be picked up by inductively sensing the power supply line feeding the torque motor 62. The canceling torque is applied to the drive shaft 40 directly via the motor 62, in a manner analogous to that described hereinbefore and illustrated in FIG. 7A, effectively removing the vibration/error torque on the drive shaft caused by the meshing of the gear teeth.

In the embodiment illustrated in FIG. 8, the feedback error/vibration signal can also be equivalently derived from vibration sensors 50 mounted on or in the gear box assembly, as shown and described with respect to FIG. 7A. Also, the torque motor may be applied to the driven shaft, instead of the drive shaft, to achieve an equivalent effect.

Similarly, alternative torque motors may be implemented, such as an implementation wherein a rotor is fixed to the drive or driven shaft and both the rotor and stator travel with the rotating shaft while the appropriate cancellation signal is capacitively or inductively coupled to the torque motor.

When an electrical motor is used as the prime mover of a gear assembly, as described herein one may modulate the input to the motor to cause the desired torque modulation by modulating the input to the power supply, or by inductively coupling and modulating the input to the power lines between the power supply and the motor (if the power supply is too low pass to respond to the desired modulation). Similarly, canceling torque, as described herein, can be introduced by torque sources applied to the prime mover, or applied to the drive or driven shaft. It should be appreciated that other approaches, or combinations of the foregoing, for modulating the canceling input can be implemented to actively cancel gear mesh noise, such as electrodynamic shakers, or electro or magnetostrictive transducers attached to shafts or gears with the corrective excitation electrically or magnetically coupled thereto.

Likewise, various methods, or combinations of methods, of acquiring the vibration or error signal associated with the gear mesh vibration/noise can be implemented according to the invention. The gear mesh noise can be acquired and a vibration or error signal generated by locating at least one error signal transducer, such as an accelerometer or a microphone proximate to the meshed gears, or on, or in a housing containing the gear assembly. As described herein, current or voltage in the electrical supply line to the prime mover can be used to obtain the vibration or noise signal indicative of gear mesh noise. It will be appreciated that other transducers, pressure or electrical sensors or the like can be implemented for acquiring the gear mesh noise information.

Further, although alternative means of acquiring the error or vibration signal representative of gear mesh noise are each shown and respectively described, e.g. inductive sensing of input line current and transducers mounted proximate to the gear assembly, it should be appreciated that use of such means is not mutually exclusive, and such means, or a plurality of such means can be used in combination or in various combinations.

Although gear mesh noise cancellation according to the invention is described in the context of applications involving a bevel gear set, it will be appreciated, as pointed out, that active noise cancellation can be implemented in other gear applications including spur, helical and worm gears or the like. Similarly, active noise cancellation of gear mesh noise can be implemented in applications where there are a plurality of gears and/or gear sets meshed.

It will be appreciated that several different combinations of error sensors, control mechanisms/algorithms, torque sources and methods of modulating the input to an electrical motor prime mover have been conceived, and are conceivable, for providing the modulated torque applied for active gear mesh noise cancellation according to the invention.

Although the invention has been shown and described with respect to illustrative embodiments thereof, the foregoing and various other changes, omissions and additions in the form and detail thereof may be made therein without departing from the spirit and scope of the invention.

What is claimed is:

1. An apparatus having active noise cancellation of gear mesh noise of a gear assembly including at least a first drive shaft having a first gear disposed thereon and a second gear, comprising:

a prime mover actuating said first drive shaft having said first gear disposed thereon, said first gear engaging said second gear to drive a load;

at least one error signal sensor sensing vibration and/or noise of said first gear meshing with said second gear, said at least one error signal sensor providing an error signal indicative of the vibration and/or noise sensed at said first gear meshing with said second gear;

a control mechanism receiving said error signal from said at least one error signal sensor, said control mechanism processing said error signal to translate said error signal into a cancellation torque; and a torque source applying said cancellation torque to at least said first drive shaft.

2. The apparatus of claim 1 wherein the cancellation torque is continually controlled based on information from said at least one error signal sensor which continually responds to mechanisms that create vibration and/or noise at said first and second gears.

3. The apparatus of claim 1 wherein said gear assembly includes a housing containing said first and second gears and said at least one error signal sensor is located on or inside said housing.

4. The apparatus of claim 3 wherein said at least one error signal sensor is at least one of a microphone and an accelerometer.

5. The apparatus of claim 1 wherein said prime mover is an electric motor and said at least one error signal sensor is inductively coupled to said electric motor's electrical input.

6. The apparatus of claim 1 wherein said prime mover is an electric motor and said at least one error signal sensor is inductively coupled to a power supply input line of said prime mover.

7. The apparatus of claim 6 wherein said prime mover is a D.C. electric motor and said torque source includes an amplifier and a blocking capacitor which applies said cancellation torque through a power supply input line to said D.C. electric motor.

8. The apparatus of claim 6 wherein said prime mover is an A.C. electric motor and said torque source includes an amplifier and a tuned LC blocking circuit which applies said cancellation torque through a power supply input line to said A.C. electric motor.

9. The apparatus of claim 1 wherein said torque source is a torque motor having a rotor fixed to said first drive shaft and a stator, and said torque motor is configured to apply said cancellation torque to said drive shaft.

10. The apparatus of claim 1 further including a driven shaft attached to said second gear, said driven shaft driving a load, and wherein said torque source is a torque motor having a rotor fixed to said driven shaft, said torque motor being configured to apply said cancellation torque to said driven shaft.

11. A method for cancelling noise from a gear assembly meshing in a system having a prime mover driving said gear assembly, said gear assembly including at least a first drive shaft having a first gear disposed thereon and a second gear, said method comprising the steps of:

sensing noise/vibration from said gear assembly meshing and producing a vibration signal indicative of frequencies and respective amplitudes of noise/vibration sensed;

processing said vibration signal to generate a modulating torque signal corresponding to frequencies and respective amplitudes of noise/vibration sensed; and applying said modulating torque signal to at least one of said prime mover and said first drive shaft.

12. The method of claim 11 further including the step of locating a vibration sensor proximate said gear assembly to effect the step of sensing noise/vibration from said gear assembly meshing.

13. The method of claim 12 wherein said vibration sensor is at least one of a microphone and an accelerometer.

14. The method of claim 11 wherein said gear assembly includes a housing containing at least said first gear and said second gear, and said step of sensing noise/vibration from said gear assembly meshing includes locating a vibration sensor on or inside said housing.

15. The method of claim 11 wherein said prime mover is an electric motor and said step of sensing noise/vibration from said gear assembly meshing includes inductively coupling at least one noise sensor to a power supply input line of said electric motor.

16. The method of claim 11 wherein said prime mover is an electric motor and said step of applying said modulating torques signal to at least one of said prime mover and said first drive shaft involves applying said modulating torque signal via a torque source that includes an amplifier and at least one of a blocking capacitor and a tuned LC circuit, which applies said modulating torque signal to a power supply input line to said electric motor.

17. The method of claim 11 wherein said gear assembly further includes a second drive shaft connected to said second gear, said second drive shaft driving a load, and wherein said step of applying said modulating torque signal to at least one of said prime mover and said first drive shaft involves applying said modulating torque signal to at least one of said first drive shaft and said second drive shaft via a torque source that includes a torque motor having a rotor fixed to one of said first drive shaft and said second drive shaft, and wherein said torque motor is configured to apply said modulating torque signal to one of said first drive shaft and said second drive shaft.

* * * * *